United States Patent
Kim et al.

(10) Patent No.: US 8,883,254 B2
(45) Date of Patent: Nov. 11, 2014

(54) METHOD OF SYNTHESIZING HOLLOW SILICA FROM SODIUM SILICATE

(71) Applicant: Korea Institute of Geoscience and Mineral Resources, Daejeon (KR)

(72) Inventors: Jiwoong Kim, Incheon (KR); Hee Dong Jang, Daejeon (KR); Han Kwon Chang, Daejeon (KR)

(73) Assignee: Korea Institute of Geoscience and Mineral Resources, Daijeon (KR)

(*) Notice: Subject to any disclaimer, the term of this patent is extended or adjusted under 35 U.S.C. 154(b) by 0 days.

(21) Appl. No.: 14/077,982

(22) Filed: Nov. 12, 2013

(65) Prior Publication Data

US 2014/0141163 A1    May 22, 2014

(30) Foreign Application Priority Data

Nov. 21, 2012 (KR) .................. 10-2012-0132219

(51) Int. Cl.
  *B32B 5/16* (2006.01)
  *C01B 33/12* (2006.01)
(52) U.S. Cl.
  CPC .................. *C01B 33/128* (2013.01)
  USPC ...... 427/213.31; 427/331; 427/389; 428/402; 428/402.24; 428/402.2; 428/403
(58) Field of Classification Search
  CPC .... C04B 14/18; C04B 20/002; C04B 20/008; C04B 38/085; C04B 20/1074; C04B 28/26; G02B 1/10; G02B 5/0242; C08K 3/36; C08K 7/22; C08K 5/005; C08K 5/0016; C08K 5/13; C08K 5/49; C08K 5/3475
  USPC ......... 428/402–402.24, 403, 404, 407, 321.1, 428/474.4; 427/331, 389.9, 212, 427/213.3–213.36, 483, 256; 264/534, 5, 264/41, 4–4.7; 424/400, 408, 450, 451, 424/455, 93.7, 184.1, 497, 489, 501, 490, 424/491, 4, 92, 493, 494, 495
  See application file for complete search history.

(56) References Cited

U.S. PATENT DOCUMENTS 5,484,840 A * 1/1996 Binkley .................. 524/501
6,103,379 A * 8/2000 Margel et al. .............. 428/403

OTHER PUBLICATIONS

Wu et al., J. Porous Mater. (2012)19:913-919.*
Jung et al., Langmuir (2010) 26(8),5456-5461.*

(Continued)

*Primary Examiner* — James J Seidleck
*Assistant Examiner* — S. Camilla Pourbohloul
(74) *Attorney, Agent, or Firm* — Christie, Parker & Hale, LLP

(57) ABSTRACT

Disclosed is a method of synthesizing hollow silica having the size of micrometers from sodium silicate. The method includes fabricating a polystyrene organic template from polystyrene latex, (B) cleaning the polystyrene organic template, (C) exchanging media by using a water-base medium, introducing the cleaned polystyrene organic template and sodium silicate, and preparing a silica-coated organic template by performing an acidic hydrolysis reaction, and (D) cleaning the silica-coated organic template included in the water-base medium by using water. The size of the organic template is adjusted by controlling an amount of introduced AIBN included when the organic template is fabricated. The cleaning of the organic template is preferably performed by using water ($H_2O$). The method further includes (B) removing the organic template by using THF and (F) cleaning the hollow silica having no organic template.

8 Claims, 4 Drawing Sheets

(56) References Cited

OTHER PUBLICATIONS

Wu, et al., "Sodium silicate route: fabricating high monodisperse hollow silica spheres by a facile method," J. Porous Mater (2012) 19, pp. 913-919.

Jung, et al., "One-Step Synthesis of Structurally Controlled Silicate Particles from Sodium Silicates using a Simple Precipitation Process," Langmuir Article, 2010, 26(8), pp. 5456-5461.

* cited by examiner

UV-VIS spectra

METHOD OF SYNTHESIZING HOLLOW SILICA FROM SODIUM SILICATE

CROSS-REFERENCE TO RELATED APPLICATION

This application claims priority to Korean Patent Application No. 10-2012-0132219 filed on Nov. 21, 2012, and all the benefits accruing therefrom under 35 U.S.C. §119, the contents of which is incorporated by reference in its entirety.

BACKGROUND OF THE INVENTION

1. Field of the Invention

The present invention relates to a method of synthesizing hollow silica. In more particular, the present invention relates to a method of synthesizing hollow silica from sodium silicate.

2. Description of the Related Art

In general, since a hollow sphere has an empty space therein, the hollow sphere not only represents low density, a great specific surface area, and high porosity, but also has a property allowing different materials to pass through the surface of the hollow sphere, so that the hollow sphere has been spotlighted.

Among them, a silica ($SiO_2$) coated hollow sphere has been spotlighted for the use of solar cells, catalysts, sensors, Li-ion batteries, drug delivery systems, or adiabatic materials.

The silica-coated hollow sphere is fabricated by forming a monodispersed organic template, frequently using TEOS (Tetraethyl orthosilicate), silicic acid, or sodium silicate as a silica deriving source material, coating silica, which is formed from the silica deriving source material, on an outer portion (surface) of the monodispersed organic template, and then melting and removing the organic template so that only the silica covering the surface of the monodispersed organic template remains.

Hereinafter, a method of fabricating hollow silica according to the related art will be described.

First, in the case of the TEOS, the above monodispersed organic template is formed by using an oil-base medium, silica is coated on the outer portion of the monodispersed organic template, and the monodispersed organic template is removed, thereby fabricating the hollow silica.

In this case, the TEOS has a disadvantage in that the TEOS is used for only the organic template using the oil-base medium, but has an advantage in that the TEOS facilitates the synthesis of the hollow silica.

Therefore, when only the organic template formed by using the oil-base medium is used, the hollow silica is fabricated by using only the TEOS.

In the case, the monodispersed organic template formed by using the oil-base medium may be more easily fabricated in size of several micrometers or more.

Meanwhile, in order to prevent a monodispersed organic template from being separated from a sodium silicate when the sodium silicate is used to form the hollow silica, an organic template formed by using a water-base medium is used.

In this case, due to the reactive characteristic of the water-base medium, the monodispersed organic template having the size of nanometers may be more easily formed, but the monodispersed organic template may not be formed in the size of several micrometers or more.

In other words, when the sodium silicate is used as a source material to from the hollow silica, fabricating hollow silica particles having the size of micrometers is significantly difficult.

In this case, the size of the hollow silica particle is important because hollow silica particles having the size of several micrometers or more are advantageous when the hollow silica particles are used as reflective adiabatic materials.

When the hollow silica is used as the reflective adiabatic material, the size of the hollow silica exerts a significant influence on the reflectance thereof. When the hollow silica has the size of micrometers rather than the size of nanometers, the hollow silica represents superior reflectance. Accordingly, the hollow silica having the size of micrometers represents superior performance as an adiabatic material.

Therefore, when considering the performance of the adiabatic material, it is necessary to synthesize the hollow silica in the size of several tens nanometers, preferably, several (tens) micrometers or more instead of nanometers.

In this regard, to synthesize monodispersed hollow silica having the size of several micrometers, it is natural to require the monodispersed organic template having the size of several micrometers.

However, since it is difficult to fabricate the monodispersed organic template having the size of several micrometers when the water base material is used, it is difficult to synthesize the hollow silica having the size of several micrometers while using sodium silicate.

However, although the hollow silica having the size of several micrometers may be easily formed if the TEOS is used, the TEOS is a very high-price material. Accordingly, it is necessary to fabricate the monodispersed hollow silica through an economical scheme.

In this case, the sodium silicate among the silica deriving source materials is the cheapest material in terms of an economical aspect. Accordingly, when the hollow silica is synthesized, the scheme of using the sodium silicate is very preferable.

In this case, as described above, when the sodium silicate is used as the silica driving source material, the monodispersed organic template formed by using the water base material must be used. Accordingly, it is difficult to fabricate the monodispersed organic template having the desirable size of several micrometers to several tens micrometers.

SUMMARY OF THE INVENTION

An object of the present invention is to synthesize hollow silica particles having the size of several tens nanometers, preferably, several (tens) micrometers while using the sodium silicate that is economical.

The objects of the present invention are not limited to the above-mentioned objects, and other objects will be clearly understood by those skilled in the art.

In order to accomplish the above object, there is provided a method of synthesizing hollow silica from sodium silicate which includes (A) fabricating a polystyrene organic template from polystyrene latex, (B) cleaning the polystyrene organic template, (C) exchanging media by using a water-base medium, introducing the cleaned polystyrene organic template and sodium silicate, and preparing a silica-coated organic template by performing an acidic hydrolysis reaction, and (D) cleaning the silica-coated organic template included in the water-base medium by using water.

Preferably, step (A) of fabricating the polystyrene organic template from the polystyrene latex includes fabricating the polystyrene latex from styrene monomer through the dispersion polymerization.

In addition, the performing of the dispersion polymerization includes preparing the reaction solution by putting the styrene monomer, the MTC, the AIBN, the PVP, the ethanol, and the water ($H_2O$) into a reactor, performing a deoxygenation process in the reactor by using argon (Ar) gas, increasing a temperature of the reaction solution to a range of 70° C. to 80° C., and performing a reaction with a stirring work after the temperature of the reaction solution reaches the range of 70° C. to 80° C. The temperature of the reaction solution is preferably 70° C.

In this case, step (B) of cleaning the polystyrene organic template includes cleaning the polystyrene organic template by using water ($H_2O$).

In this case, the amount of the introduced AIBN is determined by taking into consideration a desirable size of the organic template. If the amount of the introduced AIBN is in the range of 0.1 g to 0.5 g based on 10 g of introduced styrene monomer, the organic template having the size of several (tens) micrometers which is desirable can be acquired. If necessary, the amount of the introduced AIBN may be in the range of 0.1 g to 02 g or the range of 0.2 g to 0.5 g based on 10 g of introduced styrene monomer.

Preferably, the method of synthesizing the hollow silica from the sodium silicate according to the present invention further includes (E) removing the organic template by using tetrahydrofuran (THF), and (F) cleaning the hollow silica having no organic template.

In this case, preferably, step (F) of cleaning of the hollow silica having no organic template includes cleaning the hollow silica by using water ($H_2O$).

Details of other embodiments are included in the detailed description and the accompanying drawings.

The advantages, the features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

In the following description, the same reference numbers will be assigned to the same components, and the description of the size, the position, and the bonding relationship of each component may be exaggerated for the clarity of the description.

As described above, according to the method of synthesizing the hollow silica using the sodium silicate, the hollow silica particles having the size of several micrometers can be fabricated while using low-price sodium silicate instead of conventional high-price TEOS.

DETAILED DESCRIPTION OF THE INVENTION

Hereinafter, embodiments of the present invention will be described in detail with reference to accompanying drawings.

First, the present invention will be described in comparison with the related art.

As described above, when the hollow silica particles are used as reflective adiabatic materials, fabricating hollow silica particles in the size of several micrometers or more is most preferable. However, the use of the conventional TEOS is advantageous in that the hollow silica particles can be easily fabricated in the size of several micrometers by using an oil-base medium, but disadvantageous in terms of an economical aspect because the TEOS is a high-price material.

Meanwhile, when sodium silicate advantageous in terms of an economical aspect is used, hollow silica particles may be easily fabricated in size of nanometers by using a water-base medium, but may not be fabricated in size of several micrometers or more.

Therefore, the present inventors have devised schemes capable of fabricating hollow silica particles having the size of several micrometers or more while fabricating hollow silica particles by using the sodium silicate. The present inventors reach a conclusion that a monodispersed organic template having the size of several micrometers is acquired by using an oil-base medium similarly to the case of TEOS, cleaned with water, coated with silica derived from the sodium silicate by using a water-base medium, and removed, thereby acquiring the hollow silica particles having a predetermined size of several micrometers.

Figure 1:
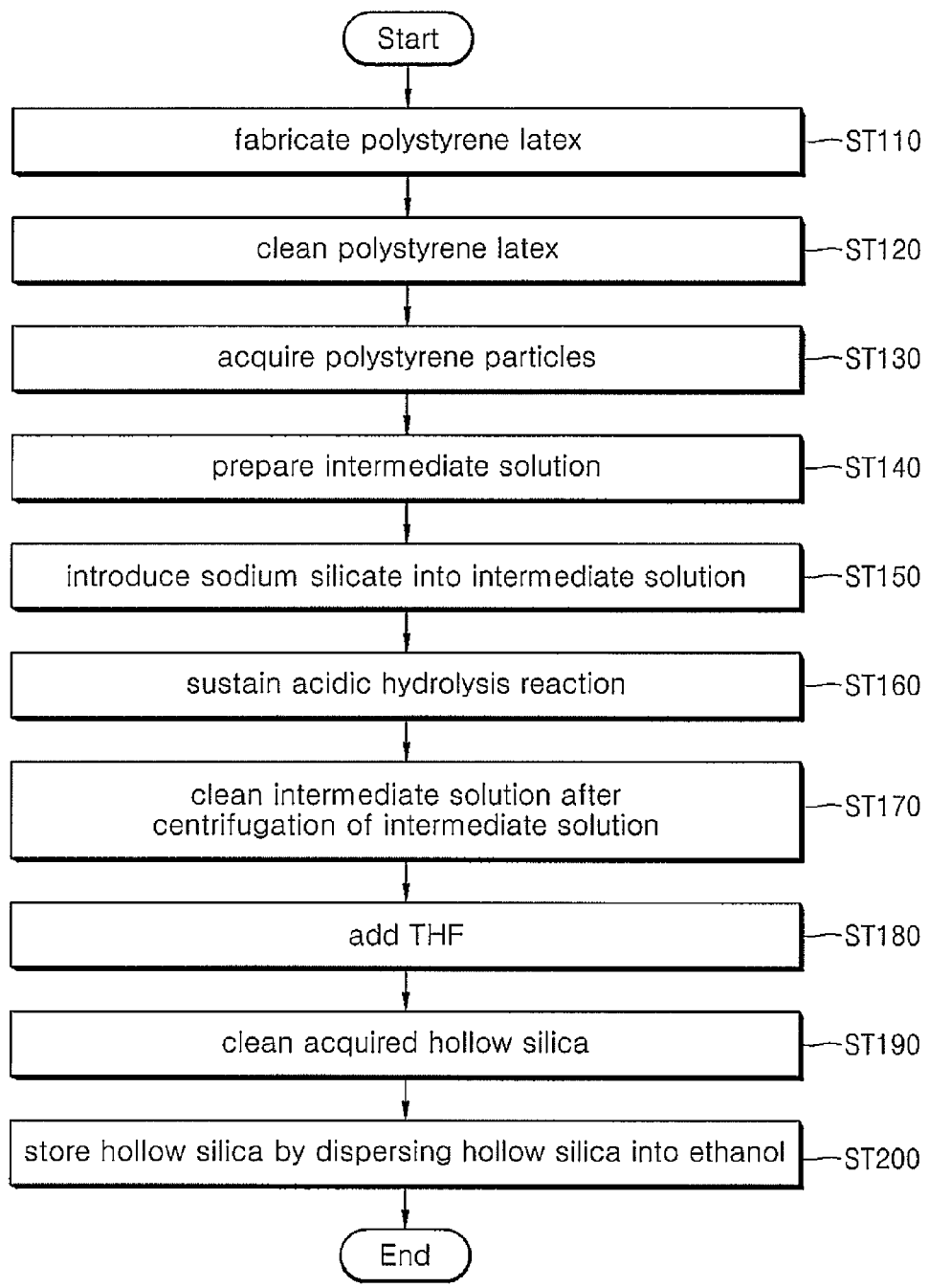
FIG. 1 is a flowchart schematically showing the sequence of synthesizing hollow silica by using sodium silicate according to an exemplary embodiment of the present invention.

FIG. 1 is a flowchart schematically showing the sequence of synthesizing hollow silica by using sodium silicate according to an exemplary embodiment of the present invention.

Referring to FIG. 1, the method of synthesizing hollow silica from sodium silicate according to the present invention includes a step (ST110) of fabricating monodispersed polystyrene latex, a step (ST120) of cleaning the monodispersed polystyrene latex, a step (ST130) of acquiring polystyrene particles, a step (ST140) of preparing an intermediate solution, a step (ST150) of introducing sodium silicate into the intermediate solution, a step (ST160) of sustaining an acidic hydrolysis reaction, a step (ST170) of cleaning the intermediate solution after the centrifugation of the intermediate solution, a step (ST180) of adding tetrahydrofuran (THF), a step (ST190) of cleaning the acquired hollow silica, and a step (ST200) of storing the hollow silica by dispersing the hollow silica into ethanol.

Fabrication of Monodispersed Polystyrene Latex

In the step (ST110) of fabricating the monodispersed polystyrene latex, polystyrene latex was fabricated from a styrene monomer through a dispersion polymerization.

In order to fabricate the monodispersed polystyrene latex, styrene monomer, MTC (2-(methacryloyl)ethyltrimethylammonium chloride), AIBN (2,2'-Azoisobutyronitrile), PVP (polyvinylpyrrolidone), ethanol, and water ($H_2O$) were introduced into a reactor and mixed.

In this case, although it is most preferred that the above materials are simultaneously introduced, the above materials may be sequentially introduced.

Thereafter, deoxygenation was performed in the reactor by injecting inert gas, preferably, argon (Ar) gas.

Next, after the internal temperature of the reactor was increased to 70° C., the reaction to the above materials was made at 100 RPM for 24 hours while the above materials were stirred. Finally, the monodispersed polystyrene latex was acquired.

In this case, the internal temperature of the reactor is preferably maintained at the range of 70° C. to 80° C., and more preferably maintained at 70° C. The rate of stirring the above materials is preferably in the range of 50 RPM to 200 RPM, and most preferably 100 RPM. The time of stirring the above materials is preferably in the range of 20 hours to 30 hours, and most preferably 24 hours.

If the above conditions are not satisfied, the monodispersed polystyrene latex may not be acquired.

In this case, notably, the oil-base medium was used in order to form a monodispersed organic template in desirable size in the present step of fabricating the monodispersed polystyrene latex.

Further, in the present step, an influence exerted on the size of the organic template by an amount of introduced AIBN was examined by differently introducing the AIBN, which serves as an initiator, by 0.1 g, 0.2 g, or 0.5 g depending on the sizes of the monodispersed organic template.

The details of the results will be made below with reference to FIG. 4 in the description of the embodiment.

Cleaning of Monodispersed Polystyrene Latex

The step (ST120) of cleaning the monodispersed polystyrene latex is to clean the monodispersed polystyrene latex acquired in the step (ST110) of fabricating the monodispersed polystyrene latex.

In the present step, the monodispersed polystyrene latex was cleaned by using water ($H_2O$).

Alternatively, various cleaning schemes of removing the oil-base medium from the monodispersed polystyrene latex may be used in addition to a cleaning scheme using water ($H_2O$).

According to the present invention, 30 ml of the monodispersed polystyrene latex was subject to centrifugation and cleaned three times by using distilled water.

In the present invention, the point of sufficiently cleaning the polystyrene latex by using water ($H_2O$) is important rather than the number of times to clean the monodispersed polystyrene latex.

Acquisition of Polystyrene Particles

The step (ST130) of acquiring polystyrene particles is to simply acquire particles obtained through water cleaning in the step (ST120) of cleaning the monodispersed polystyrene latex.

Preparation of Intermediate Solution

The step (ST140) of preparing the intermediate solution is to prepare the intermediate solution by exchanging media using a water-base medium. According to the step (ST140), 30 ml of polystyrene particles, which serve as the organic template and are acquired in the step (STP130) of acquiring the polystyrene particles, were put into water ($H_2O$), preferably, distilled water serving as the water-base medium, and the mixture was introduced into a 3-necked round flask.

In this case, an amount of water ($H_2O$) used as the water-base medium was 30 ml.

In this case, the intermediate solution refers to a solution in which polystyrene particles are dispersed in a water-base medium. It is noted that the polystyrene particles refer to polystyrene particles acquired by cleaning the monodispersed polystyrene latex using water ($H_2O$) as described above.

Hereinafter, those skilled in the art should understand the intermediate solution as a water-base medium or the water-base medium as the intermediate solution.

Introduction of Sodium Silicate into Intermediate Solution

The step (ST150) of introducing the sodium silicate into the intermediate solution is to add 0.1 M of sodium silicate ($Na_2SiO_3$) after increasing the temperature of the intermediate solution prepared in the step (ST140) of preparing the intermediate solution to 80° C.

In this case, after adding the sodium silicate into the intermediate solution, the mixture is preferably stirred.

In this case, preferably, the stirring time is maintained for about 5 minutes.

Sustenance of Acidic Hydroysis Reaction

The step (ST160) of sustaining the acidic hydrolysis reaction is to inject 0.2 M of HCl solution into the reactor under stirring after the step (ST150) of introducing the sodium silicate into the intermediate solution and then to sustain the acidic hydrolysis reaction.

In this case, the stirring rate was 100 RPM and the stirring time was about 3 hours.

In this case, in order to stably sustain the acidic hydrolysis reaction, the stirring rate is preferably in the range of 50 RPM to 200 RPM, and most preferably 100 RPM, and the stirring time is preferably in the range of 3 hours to 5 hours, and most preferably corresponds to 4 hours.

If the above conditions are not satisfied, the stable acidic hydrolysis reaction may not be made.

Cleaning of Intermediate Solution after Centrifugation of Intermediate solution, The step (ST170) of cleaning the intermediate solution after the centrifugation of the intermediate solution is to perform centrifugation with respect to the intermediate solution subject to the acidic hydrolysis reaction for 15 hours at 8000 RPM and cleaning the intermediate solution twice by using water ($H_2O$), preferably, distilled water.

Addition of Tetrahydrofuran (THF),

The step (ST180) of adding tetrahydrofuran (THF) is to dip an organic template, which is coated with silica obtained in the step (ST170) of cleaning the intermediate solution after the centrifugation of the intermediate solution, into 99.5% THF (prepared by SAMCHUN CHEMICAL CO.) and maintain the organic template in the dipped state.

In this case, the dipping time is preferably in the range of 10 hours to 30 hours, and most preferably about 24 hours.

If the dipping time is out of the range, polystyrene serving as the organic template in the hollow silica may not be sufficiently removed, or the dipping time may be unnecessarily prolonged.

Cleaning of Acquired Hollow Silica

The step (ST190) of cleaning the acquired hollow silica is to perform a centrifugation process with respect to the hollow silica, which is acquired in the step (ST180) of adding tetrahydrofuran (THF), at 8000 RPM for 15 hours and to clean the hollow silica about three times by using water (H$_2$O), preferably, distilled water.

In this case, the centrifugation rate is preferably in the range of 6000 RPM to 10,000 RPM, and most preferably 8000 RPM. The centrifugation time is preferably in the range of 10 minutes to 30 minutes, and most preferably 15 minutes.

Storage of Hollow Silica Through Dispersion of Hollow Silica into Ethanol.

The step (ST200) of storing the hollow silica by dispersing the hollow silica in ethanol is to store the hollow silica, which is acquired in the step (ST190) of cleaning the hollow silica, into ethanol by dispersing the hollow silica in the ethanol.

The reason for storing the hollow silica into the ethanol by dispersing the hollow silica in the ethanol is that the shape of the hollow silica is sufficiently maintained when the hollow silica is dispersed in the ethanol.

The hollow silica fabricated through the steps ST110 to ST200 represents in size of several (tens) micrometers. Accordingly, when the hollow silica acquired in the above manner is used, the hollow silica represents light reflectance superior to that of conventional nanometer hollow silica.

The light reflectance characteristic of the hollow silica according to the present invention will be described with reference to FIG. 4.

Embodiment

Hereinafter, the constitution and the operation of the present invention will be described in more detail according to the exemplary embodiment of the present invention. The exemplary embodiment is provided only for the illustrative purpose, and the present invention is not limited thereto.

Since other advantages and other characteristics that are not described herein can be sufficiently and technically comprehended by those skilled in the art, the details thereof will be omitted in order to avoid redundancy.

Experimental Test Sample

Various test samples used in the method of synthesizing the hollow silica using the sodium silicate according to the present invention are as follows.

Two test samples used to prepare a reaction solution are as follows.
1. Styrene Monomer (99.5%, produced by SAMCHUN CHEMICAL CO.).
2. 2-(methacryloyl)ethyltrimethylammonium chloride (MTC; 72%; produced by Alfa Aesar).

Next, AIBN is used as an initiator of polymerization.
3. AIBN(2,2'-Azoisobutyronitrile)(98%, produced by Junsei).

In addition, a PVP is used as a stabilizer.
4. PVP(Polyvinylpyrrolidone)(Mw=30,000, produced by Cica Reagent).

Finally, following two other test samples are additionally required.
5. Ethanol.
6. H$_2$O.

An amount of an added test sample is shown in a following table.

| Test sample | Amount of added sample |
|---|---|
| Styrene monomer | 10 g |
| MTC | 0.39 g |
| AIBN | 0.1 g to 0.5 g |
| PVP | 1.5 g |

| Test sample | Amount of added sample |
|---|---|
| Ethanol | 90 g |
| H$_2$O | 5 g |

After preparing a reactive solution by introducing the above test samples into the reactor, oxygen was removed from the reactor for 30 minutes by using inert gas, preferably, argon (Ar) gas. Then, the temperature of the reactive solution in the reactor was increased to 70° C.

When the above test samples are introduced into the reactor, although the sequence of introducing the samples is meaningless, the test samples are preferably simultaneously introduced into the reactor. In addition, the test samples may be sequentially introduced into the reactor.

In this case, the reactor is preferably a four-necked flask.

In addition, it should be considered that the introduced materials may be added in various amounts according to experimental scales.

Simultaneously, the deoxygenation time in the reactor may be varied according to the experimental scales.

The reaction temperature in the reactor is preferably maintained in the range of 70° C. to 80° C., and most preferably 70° C.

Then, after the temperature of the reactive solution has reached 70° C., while the reactive solution was being stirred at 100 RPM, the dispersion polymerization was maintained for 24 hours. Finally, polystyrene latex was acquired.

Since the stirring time and the maintaining time of the dispersion polymerization have been described, the details thereof will be described.

In this case, other additives are uniformly maintained in amount, and an amount of the introduced AIBN serving as an initiator is adjusted to 0.1 g, 0.2 g, and 0.5 g, respectively, in order to examine an influence exerted on the size of the polystyrene latex serving as the organic template.

It should be noted that an oil-base medium was used identically to a conventional method of fabricating hollow silica particles using TEOS as a silica deriving source material.

Since other methods of fabricating hollow silica particles has been described, the details thereof will be omitted. Hereinafter, various characteristics of hollow silica particles acquired according to the present invention will be described.

Figure 2:
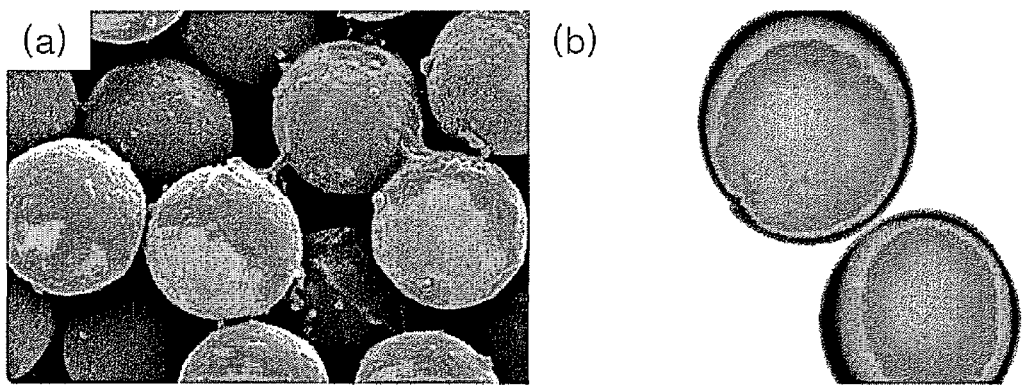
FIGS. 2(a) and 2(b) are photographs of an SEM (scanning electron microscope) and a transmission electron microscope (TEM) for silica-coated polystyrene particles in a dispersion polymerization and hollow silica particles that are acquired in the final step according to the exemplary embodiment of the present invention.

FIGS. 2(*a*) and 2(*b*) are photographs of an SEM (scanning electron microscope) and a transmission electron microscope (TEM) for silica-coated polystyrene particles in a dispersion polymerization and hollow silica particles that are acquired in the final step according to the exemplary embodiment of the present invention.

As shown in FIG. 2(*a*), since polystyrene particles serving as an organic template have been formed in substantially similar size, monodispersed organic templates can be acquired. In addition, as shown in FIG. 2(*b*), a hollow silica having no polystyrene particles serving as the organic template has a substantially circular shape.

Figure 3:
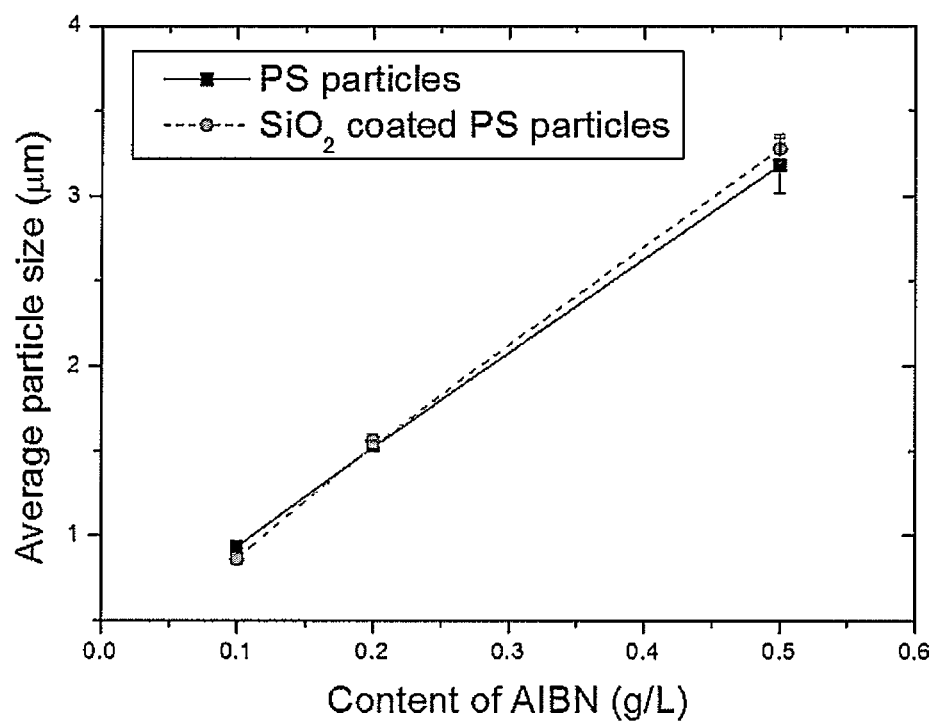
FIG. 3 is a graph showing the variation in the sizes of the hollow silica particles after measuring the variation in the sizes of the hollow silica particles when the amount of the introduced AIBN is changed according to the exemplary embodiment of the present invention.

FIG. 3 is a graph showing the variation in the sizes of the hollow silica particles after measuring the variation in the sizes of the hollow silica particles when the amount of the introduced AIBN is changed according to the exemplary embodiment of the present invention.

In FIG. 3, a horizontal axis represents an amount of an added AIBN (unit: g), and a vertical axis represents an average size of an acquired polystyrene particles (unit: μm).

In this case, the amount of the introduced AIBN is preferably in the range of 0.1 g to 0.5 g based on 10 g of introduced styrene monomer.

It can be understood from FIG. 3 that the size of the polystyrene particle serving as an organic template and the particle size of a silica-coated organic template are monotone increased as an amount of added AIBN is increased.

Therefore, the desirable size of hollow silica can be acquired according to an amount of the introduced AIBN.

Figure 4:
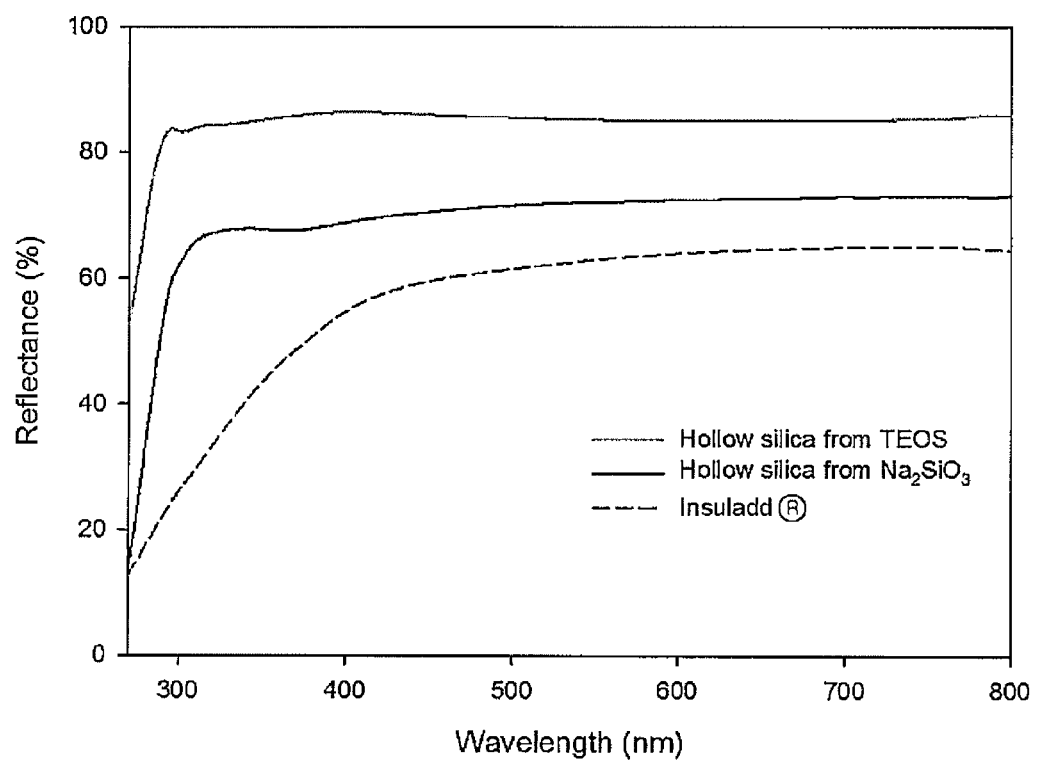
FIG. 4 shows a graph showing light reflectance spectra for hollow silica particles having the size of micrometers, which are acquired according to the exemplary embodiment of the present invention, Insuladd® sold as commercial hollow silica particles compared with the hollow silica particles according to the exemplary embodiment of the present invention, and hollow silica particles acquired from TEOS according to the related art.

FIG. 4 shows a graph showing light reflectance spectra for hollow silica particles having the size of micrometers, which can be acquired according to an exemplary embodiment of the present invention, Insuladd® sold as commercial hollow silica particles compared with the hollow silica particles according to an exemplary embodiment of the present invention, and hollow silica particles acquired from TEOS according to the related art.

As shown in FIG. 4, the light reflectance characteristic for the hollow silica having the size of micrometers acquired according to the embodiment of the present invention uniformly represents 70% of reflectance R throughout the whole wavelength band of 300 nm to 800 nm.

The hollow silica particles having the size of micrometers acquired according to the embodiment of the present invention represents the superior light reflectance characteristic when comparing with that of the Insuladd sold as commercial hollow silica particles employed for the comparison with the present invention which represent 60% of the light reflectance characteristic throughout the wavelength band of 400 nm to 600 nm.

For reference, as shown in FIG. 4, the light reflectance characteristic for hollow silica particles acquired from the TEOS according to the related art is slightly better than that for hollow silica particles acquired through the method of synthesizing hollow silica from sodium silicate according to the exemplary embodiment of the present invention. However, in terms of an economical aspect, the hollow silica acquired according to the exemplary embodiment of the present invention is fabricated at a lower cost but represents the light reflectance characteristic substantially identical to those for hollow silica particles acquired from the TEOS according to the related art.

Although the method of synthesizing hollow silica from sodium silicate according to the exemplary embodiments of the present invention have been described for the illustrative purpose, it is understood that the present invention should not be limited to these exemplary embodiments but various changes, modifications, equivalents can be made by one ordinary skilled in the art within the spirit and scope of the present invention as hereinafter claimed.

What is claimed is:

1. A method of synthesizing hollow silica from sodium silicate for reflective adiabatic materials, the method comprising:
   (A) fabricating a polystyrene organic template having an average particle size of 1 μm to 3 μm from polystyrene latex after fabricating the polystyrene latex by mixing styrene monomer, 2-(methacryloyl)ethyltrimethylammonium chloride (MTC), 2,2'-azoisobutyronitrile (AIBN), polyvinylpyrrolidone (PVP), ethanol, and water ($H_2O$) with each other and performing a dispersion polymerization with respect to the mixture, wherein the AIBN is introduced in an amount of 0.1 g to 0.5 g based on 10 g of the styrene monomer;
   (B) cleaning the polystyrene organic template;
   (C) exchanging media by using a water-based medium, introducing the cleaned polystyrene organic template and sodium silicate, and preparing a silica-coated organic template by performing an acidic hydrolysis reaction; and
   (D) cleaning the silica-coated organic template included in the water-based medium by using water.

2. The method of claim 1, wherein the performing of the dispersion polymerization comprises:
   preparing a reaction solution by putting the styrene monomer, the MTC, the AIBN, the PVP, the ethanol, and the water ($H_2O$) into a reactor;
   performing a deoxygenation process in the reactor by using argon (Ar) gas;
   increasing a temperature of the reaction solution to a range of 70° C. to 80° C.; and
   performing a reaction with stirring after the temperature of the reaction solution reaches the range of 70° C. to 80° C.

3. The method of claim 1, wherein the cleaning the polystyrene organic template comprises cleaning the polystyrene organic template by using water ($H_2O$).

4. The method of claim 1, wherein AIBN is introduced in an amount in a range of 0.1 g to 0.2 g based on 10 g of the styrene monomer.

5. The method of claim 1, wherein the AIBN is introduced in an amount in a range of 0.2 g to 0.5 g based on 10 g of introduced styrene monomer.

6. The method of claim 1, further comprising:
   (E) removing the organic template by using tetrahydrofuran (THF) to form hollow silica without the organic template; and
   (F) cleaning the hollow silica without the organic template.

7. The method of claim 6, wherein step (F) of cleaning the hollow silica without the organic template comprises cleaning the hollow silica without the organic template by using water ($H_2O$).

8. The method of claim 2, wherein the temperature of the reaction solution is 70° C.

* * * * *